United States Patent [19]

Muller

[11] 3,763,378
[45] Oct. 2, 1973

[54] VOLTAGE TRANSFORMER FOR FULLY INSULATED, METAL-CLAD HIGH VOLTAGE SWITCHING INSTALLATIONS

[75] Inventor: Willi Muller, Berlin, Germany

[73] Assignee: Siemens Aktiengesellschaft, Munich, Germany

[22] Filed: May 16, 1972

[21] Appl. No.: 253,778

[30] Foreign Application Priority Data
May 17, 1971 Germany.................. P 21 25 297.1

[52] U.S. Cl...................... 307/149, 324/74, 323/74, 323/93, 317/12 R
[51] Int. Cl. ........................................... H02m 3/06
[58] Field of Search .................. 324/74, 79; 323/74, 323/93; 317/12 R, 12 A, 12 B, 242; 307/149, 109, 110

[56] References Cited
UNITED STATES PATENTS
3,101,443    8/1963    Fried................................. 323/93 X Primary Examiner—Herman J. Hohauser
Attorney—Hugh A. Chapin et al.

[57] ABSTRACT

A voltage transformer for fully insulated, metal-clad high voltage switching installations is disclosed comprised of a high and low potential capacitor. The high potential capacitor is composed of a first laminar electrode on the inside of the metallic outer tube of the high voltage switching installation, and a second electrode formed from the high voltage conductor of the installation. A low potential capacitor is connected to the high potential capacitor and has an amplifier connected across the low potential capacitor and terminates in a load. The laminar electrode is preferably formed of a tube which, together with the high voltage conductor, forms a cylindrical capacitor.

6 Claims, 1 Drawing Figure

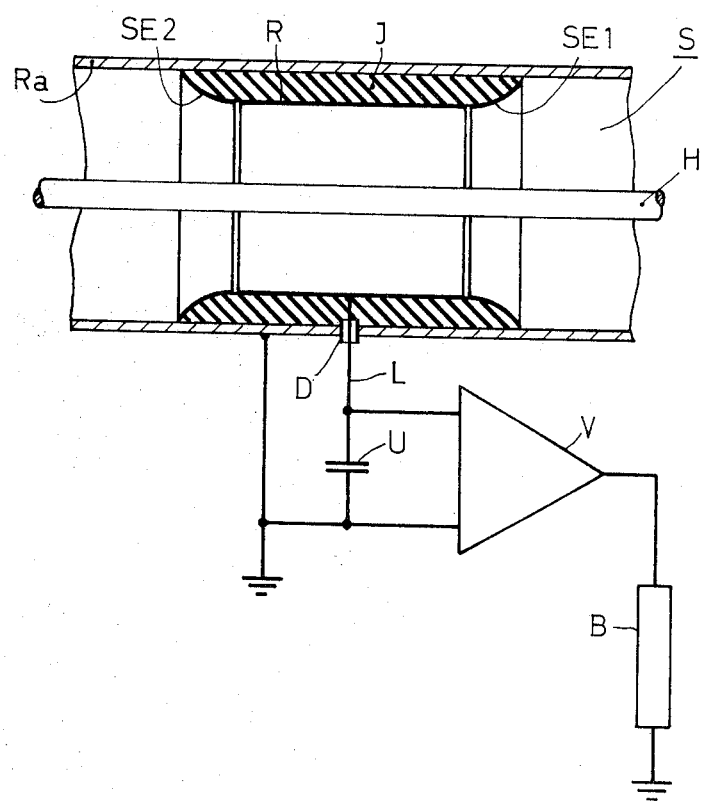

VOLTAGE TRANSFORMER FOR FULLY INSULATED, METAL-CLAD HIGH VOLTAGE SWITCHING INSTALLATIONS

FIELD OF THE INVENTION

The invention is concerned with a voltage transformer; more particularly, a voltage transformer for fully insulated, metal-clad high voltage switching installations.

DESCRIPTION OF THE PRIOR ART

The published German Pat. application No. 1,807,997 shows a fully insulated voltage tranformer using gas as an insulating medium for metal-clad high voltage switching installations. In that transformer, the high voltage winding is disposed inside an insulating body, and both the windings and core are arranged in a pressure vessel filled with the insulating gas. The vessel can be flange-connected to the metal encapsulation of the switching installation to form a gas-tight fit. In the area around the high voltage connection the insulating body has a surrounding flange, by which the insulating body is attached to a mounting plate having an opening to allow access into the area of the insulating body at the high voltage connection to the metal capsule. The mounting plate is attached to the open end of the pressure vessel, thereby forming, together with the flange, a closure on the pressure vessel at the metal encapsulation. This known voltage transformer is, therefore, an inductive voltage transformer.

A voltage transformer of this type, however, is usable only for rated voltages up to a limited amount. For high rated voltages, transformer design requires either larger transformers or a smaller power rating if the iron core is divided. Also the design of inductive voltage transformers for high rated voltages are expensive for high pulse voltage ratings and freedom from partial discharge.

It is therefore an object of this invention to form a voltage transformer for fully insulated, metal-clad high voltage switching installations which is also usable for high rated voltages without the danger that use at such voltages will become unprofitable because of the cost and space requirements.

SUMMARY OF THE INVENTION

The solution of the problems of the prior art are accomplished by a voltage transformer for fully insulated, metal-clad high voltage switching installations, in which, according to the invention, there is arranged on the inside of the metallic outer tube of the high voltage switching installation a laminar electrode which together with the high voltage conductor of the installation forms the high potential capacitor of a voltage divider. To the low potential capacitor of the divider (which is connected with the high potential capacitor) an amplifier terminated by a load is connected.

It is admittedly known from Elektrotechnische Zeitschrift, Series A, pages 309–312 (1967), to use measuring amplifiers where the input impedance is sufficiently high, to measure very high voltages by using the capacitances of current transformers or feed throughs in the range of a few hundred pF, coupled to the amplifier. No indication, however, is found in this reference for the design embodied in this invention of a voltage transformer for fully insulated, metal-clad high voltage switching installations.

In the voltage transformer according to this invention, the laminar electrode can be designed in different ways, but it appears advantageous that it be designed as a tube which, together with the high voltage conductor, forms a cylindrical capacitor.

It further appears advantageous to connect guard ring electrodes to both sides of the tube which forms the laminar electrode. This gives a defined capacitance to the high potential capacitor.

The laminar electrode of the high potential capacitor as well as the guard ring electrodes can be designed in different ways. The laminar electrode, which in general is arranged near the outer tube of the high voltage switching installation can, for example, be insulated from the outertube by an intermediate layer of solid insulating material. However, it appears advantageous if the eletrodes are conductive coatings applied on the inside surfaces of a current transformer arranged within the outer tube of the high voltage switching installation. In that case, a combined current and voltage transformer for fully insulated, metal-clad switching installations can be obtained in a simple manner by the invention by starting with a current transformer and forming an additional voltage transformer, by merely applying conductive coatings on the inside surfaces of the current transformer's body and providing a low potential capacitor having a connected, load-terminated amplifier.

The low potential capacitor of the voltage transformer according to the invention can be realized in different ways. It can, for instance, be formed by connecting the laminar electrode of the high potential capacitor as one electrode, with the outer tube of the high voltage switching installation forming the other electrode, with a solid dielectric advantageously inserted between the two electrodes. It is preferred, however, in a design of the voltage transformer acording to the invention, to arrange the low potential capacitor as a separate component outside of the outer tube of the high voltage switching installation.

In such a design of the low potential capacitor, in order to largely eliminate any influence of temperature drift on the capcitor-divider of the voltage transformer according to the invention, the low potential capacitor is advantageously attached to the outer tube of the high voltage switching installation in such a manner that it is always at about the same temperature as the outer tube. By this connection temperature changes in the divider ratio of the voltage divider as a result of temperature changes are largely prevented; thus preventing a measuring error.

The amplifier of the voltage transformer according to the invention is advantageously an amplifier in which the transfer function is stabilized by negative feedback and designed to feed a connected load from the output of its power stage.

BRIEF DESCRIPTION OF THE DRAWINGS

Further details of the invention will be explained by an example of an embodiment of the voltage transformer constructed according to the invention shown in schematic form in FIG. 1.

DESCRIPTION OF THE PREFERRED EMBODIMENT

The high potential capacitor of the voltage transformer for fully insulated, metal-clade high voltage switching installations is shown designed as a cylindrical capacitor, one of its electrodes being formed by the high voltage conductor H of the high voltage switching installation S, and its other electrode by a laminar electrode designated as the tube R. For the purpose of defining a fixed capacitance for the high potential capacitor, guard ring electrodes $SE_1$ and $SE_2$ are arranged on both sides of the tube R. As will be seen in the Figure, the laminare electrode R of the high potential capacitor is arranged near the outer tube Ra of the high voltage switching installation S and is insulated from this grounded tube Ra by solid insulating material J. The body formed by the insulating material J may be the body of a current transformer, in which case the laminar electrode R as well as the guard ring electrodes $SE_1$ and $SE_2$ form coatings on the inside surfaces of the current transformer body. A combined current and voltage transformer for fully insulated, metal-clad high voltage switching installations is then realized. Such a design is shown in the Figure.

The tube R, representing the outer electrode of the high potential capacitor, is connected by means of the line L, brought out through an insulated opening or feed-through D, with the low potential capacitor U. This capacitor is grounded at its other electrode. Incidentally, as is common practice in high voltage switching installations, the outer tube Ra is also grounded.

According to the invention, an amplifier V is connected to the low potential capacitor U of the voltage transformer. The transfer function of amplifier V is stabilized by negative feedback. The amplifier V is followed by a usual load B, which may be, for instance, a measuring instrument and/or a system protection device.

By means of the invention, a voltage transformer for fully insulated, metal-clad switching installations is formed capable of manufacture with relatively few additional components. Because the high potential capacitor is obtained largely by using existing elements of the high voltage switching installation, an additional, separate component is not required to form this capacitor. The voltage transformer according to the invention can threfore be manufactured relatively inexpensively. Due to its construction, it also allows for handling of very high voltages while requiring little space. If the installation of a single-phase current transformer is intended in high voltage switching installations, a combined current and voltage transformer can be made by means of the invention in a simple manner by utilizing the inner surfaces of the current tranformer body to accommodate one electrode of the high potential capacitor.

In the foregoing, the invention has been described in reference to specific exemplary embodiments. It will be evident, however, that variations and modifications, as well as the substitution of equivalent constructions and arrangements for those shown for illustration, may be made without departing from the broader scope and spirit of the invention as set forth in the appended claims. The specification and drawings are accordingly to be regarded in an illustrative rather than in a restrictive sense.

What is claimed is:

1. A voltage transformer for fully insulated metal-clad high voltage switching installations comprising
   a high voltage conductor,
   an outer tube surrounding said high voltage conductor,
   a high potential capacitor comprising a first electrode diposed within the interior of said outer tube having an intermediate layer of insulating material between it and the outer tube and a second electrode formed by the high voltage conductor,
   a low potential capacitor connected between the first electrode of the high potential capacitor and ground, and
   an amplifier connectd across said low potential capacitor having a load connected thereto.

2. A voltage transformer in accordance with claim 1 wherein the first electrode of the high voltage capacitor comprises a tubular electrode disposed within the outer tube and separated therefrom by insulation to form a cylindrical capacitor with the high voltage conductor.

3. A voltage transformer in accordance with claim 2 wherein the tubular electrode has a pair of guard ring electrodes disposed at the ends of said tubular electrode between said electrode and said outer tube.

4. A voltage transformer for fully insulated metal-clad high voltage switching installations comprising
   a high voltage conductor,
   an outer tube surrounding said high voltage conductor to form the high voltage switching station,
   a current tranformer disposed within the outer tube of the switching station,
   a high potential capacitor, the first electrode of which is comprised of conductive coatings applied to the inside surface of said current transformer, and said second electrode is formed by the high voltage conductor,
   a low potential capacitor connected between the first electrode of the high potential capacitor and ground, and
   an amplifier connected across said low potential capacitor having a load connected thereto.

5. A voltage tranformer in accordance with claim 1 wherein the low potential capacitor and the amplifier are externally connected to the switching installation to maintain the capacitor and the amplifier at about the same ambient temperature.

6. A voltage transformer in accordance with claim 1 wherein the amplifier has a high input impedance with negative feedback stabilization of the gain of said amplifier to provide constant gain.

* * * * *